United States Patent
Wu et al.

(10) Patent No.: US 6,836,841 B1
(45) Date of Patent: Dec. 28, 2004

(54) PREDICTING OUTPUT OF A REUSE REGION USING PRIOR EXECUTION RESULTS ASSOCIATED WITH THE REUSE REGION

(75) Inventors: Youfeng Wu, Palo Alto, CA (US); Dong-Yuan Chen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 09/607,580

(22) Filed: Jun. 29, 2000

(51) Int. Cl.[7] .............................................. G06F 9/40
(52) U.S. Cl. ...................................... 712/227; 712/220
(58) Field of Search ................................. 712/227, 220

(56) References Cited

U.S. PATENT DOCUMENTS 5,742,805 A * 4/1998 Kulkarni et al. ............ 712/239

OTHER PUBLICATIONS

Huang, Jian et al. "Exploiting Basic Block Value Locality with Block Reuse", Jan. 13, 2003, Fifth International Symposium OnHigh–Performance Computer Architecture, 1999. Proceedings. pp. 106–114.*

Gonzalez, Antonio et al. "Trace–Level Reuse", Sep. 24, 1999, 1999 International Conference on Parallel Processing, 1999. Proceedings. pp. 30–37.*

Connors, D., et al., "Compiler–Directed Dynamic Computation Reuse: Rationale and Initial Results," 32th International Symposium on Microarchitecture (Micro32), Nov.–Dec. 1999.

Marcuello, P., et al., "Value Prediction for Speculative Multithreaded Architectures," 32th International Symposium on Microarchitecture (Micro32), Nov.–Dec. 1999.

* cited by examiner

*Primary Examiner*—Eddie Chan
*Assistant Examiner*—Charles Harkness
(74) *Attorney, Agent, or Firm*—Blakely, Sokoloff, Taylor & Zafman LLP

(57) ABSTRACT

In one embodiment, a method for speculatively reusing regions of code includes identifying a reuse region and a data input to the reuse region, determining whether a data output of the reuse region is contained within reuse region instance information pertaining to a plurality of instances of the reuse region, and when the data output is not contained within the reuse region instance information, predicting the data output of the reuse region based on the reuse region instance information.

23 Claims, 9 Drawing Sheets

US 6,836,841 B1

PREDICTING OUTPUT OF A REUSE REGION USING PRIOR EXECUTION RESULTS ASSOCIATED WITH THE REUSE REGION

FIELD OF THE INVENTION

The present invention relates generally to microprocessors, and more specifically to microprocessors capable of speculatively reusing regions of software code.

BACKGROUND OF THE INVENTION

Modern software programs include many instructions that are executed multiple times each time the program is executed. Typically, large programs have logical "regions" of instructions, each of which may be executed many times. When a region is one that is executed more than once, and the results produced by the region are the same for more than one execution, the region is a candidate for "reuse." The term "reuse" refers to the reusing of results from a previous execution of the region.

For example, a reuse region could be a region of software instructions that, when executed, read a first set of registers and modify a second set of registers. The data values in the first set of registers are the "inputs" to the reuse region, and the data values deposited into the second set of registers are the "results" of the reuse region. A buffer holding inputs and results can be maintained for the region. Each entry in the buffer is termed an "instance." When the region is encountered during execution of the program, the buffer is consulted and if an instance with matching input values is found, the results can be used without having to execute the software instructions in the reuse region. When reusing the results is faster than executing the software instructions in the region, performance improves.

However, in order to achieve performance improvement, a large number of instances must be maintained for each reuse region, thereby increasing the cost involved in reusing regions of software instructions. Similarly, when execution of a reuse region creates a large number of results, reuse is costly and inefficient as the likelihood of reusing each of the multiple results decreases.

Another problem with reuse arises when the reuse region contains a memory load instruction that accesses a memory location modified by a memory update instruction outside the region. For such regions (called "aliased" regions), even when a matching instance exists in the buffer, the reuse instance may not be usable because the aliased memory load may read a different value that causes the correct results to differ from the results in the instance. Furthermore, current microprocessors lack any reuse capability when no matching instance is found in the buffer.

Therefore, it would be advantageous to provide an alternate method and apparatus for reusing regions of software code.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1B:
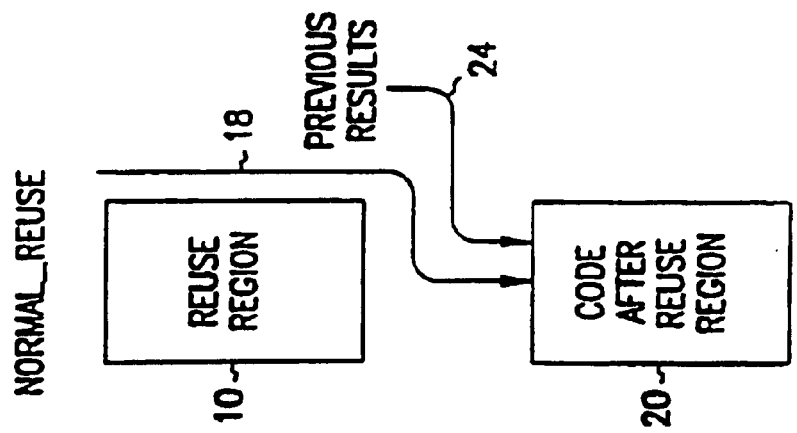
FIGS. 1A-1C illustrate a code reuse region and a code region following the code reuse region in various execution scenarios.

A method and apparatus for speculatively reusing regions of code are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for speculatively reusing regions of code. In one embodiment, when a reuse region is encountered during execution of code, a determination is made as to whether a data output of the reuse region is contained within reuse region instance information. The reuse region instance information pertains to a plurality of instances of the reuse region. When the data output is not contained within the reuse region instance information, the data output of the reuse region is predicted and used speculatively based on the reuse region instance information.

In one embodiment, a dual core processor executes code in parallel. When the data output of the reuse region is predicted, a "main" processor core speculatively executes the code following the reuse region using the predicted data output, while a "checking" core executes the code in the reuse region to verify the predicted output used in the speculative execution.

Another embodiment may include more than two cores. For example, some embodiments may include multiple reuse checking cores. In these embodiments, the main core can assign threads to more than one reuse checking core. This allows more reuse checking to be performed in parallel.

In either embodiment, if the prediction of the data output is verified to be correct, then the execution of the code after the reuse region is successfully executed in parallel with the execution of the reuse region. If the prediction is incorrect, the code after the reuse region is executed again using the results produced by the code in the reuse region.

Predicting output values of reuse regions provides an inexpensive and efficient mechanism for reusing regions of code even if an instance with a matching input is not found or if such an instance has a potential to be invalidated due to an aliased memory instruction within the reuse region. Furthermore, this prediction mechanism makes it unnecessary to store a large number of instances for each reuse region because finding a matching instance is no longer a requirement for reusing a region of code. Instead, output values of a reuse region can be predicted using reuse region instance information.

Figure 1A:
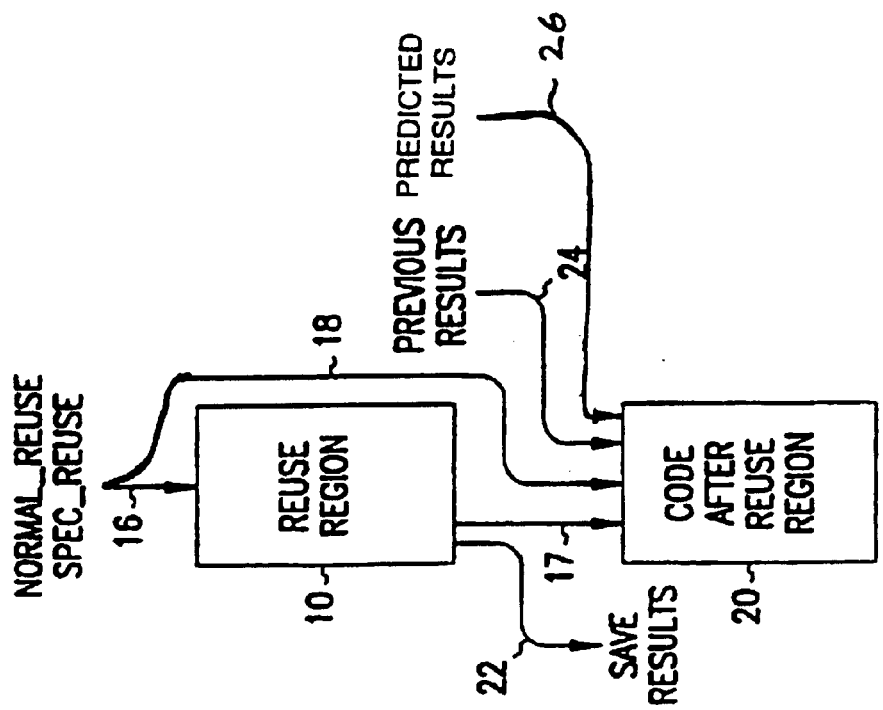

FIG. 1A shows reuse region 10 followed by code region 20. Code region 20 logically follows reuse region 10, and does not necessarily physically follow reuse region 10. For example, code region 20 can include code that resides contiguous with reuse region 10 in memory, or can include code that does not reside contiguous with reuse region 10. Examples of non-contiguous regions include code in another function or code in another library.

Reuse region 10 is a code region designated by a compiler as a reuse region. When reuse region 10 is executed, as shown by path 16, results of the execution of reuse region 10 are stored, as shown by path 22, in an instance in a buffer (not shown). In one embodiment, the buffer is a reuse and value prediction (RVP) buffer. The RVP buffer is used to store instances and predict data outputs of reuse regions. In another embodiment, more than one buffer may be used to perform the above functions. For example, a reuse buffer may be used to store instances of reuse regions, and a value prediction buffer may be used to predict data outputs of reuse regions.

When region 10 is encountered and a matching instance is found in the buffer, previous results are reused, as shown by path 24, and code region 20 may be able to be executed immediately, as shown by path 18. When region 10 is encountered and either a matching instance is not found or the reuse region is aliased (i.e., contains a memory load instruction that accesses a memory location modified by a memory update instruction outside the reuse region), results of the reuse regions are predicted using the previous results, and the predicted results are used, as shown by path 26, to enable immediate execution of code region 20, as shown by path 18.

FIG. 1A also shows two processor instructions, "normal reuse," and "spec reuse." "Spec reuse" is short for "speculative reuse." When reuse region 10 is aliased, the compiler inserts a spec reuse instruction at the beginning of reuse region 10. Otherwise, if reuse region 10 is not aliased (i.e., reuse region 10 is "pure"), the compiler inserts a normal reuse instruction at the beginning of reuse region 10. The compiler that compiles reuse region 10 determines whether reuse region 10 is aliased. Determination as to whether reuse region is aliased can be accomplished by searching for memory load instructions within reuse region 10. If reuse region 10 does not have memory load instructions, or only has memory load instructions that load from read-only memory, then reuse region 10 is not aliased.

For completeness, FIG. 1A shows many different possible paths. Not all of the paths listed are necessarily taken when a processor encounters reuse region 10. During execution, a processor decodes the normal reuse or spec reuse instruction at the beginning of reuse region 10, searches the buffer and performs accordingly. Some possible scenarios are shown in FIGS. 1B and 1C.

FIG. 1B shows a scenario where reuse region 10 is a pure reuse region and a matching instance exists in the buffer. Because reuse region 10 is a pure reuse region, there is no concern that an aliased load may make an otherwise matching instance unusable. Reuse region 10 can be identified as a pure reuse region by the normal reuse instruction. When a matching instance is found, the previous results from the matching instance are reused as shown by path 24, and execution bypasses reuse region 10 and proceeds directly to region 20 as shown by path 18.

Figure 1C:
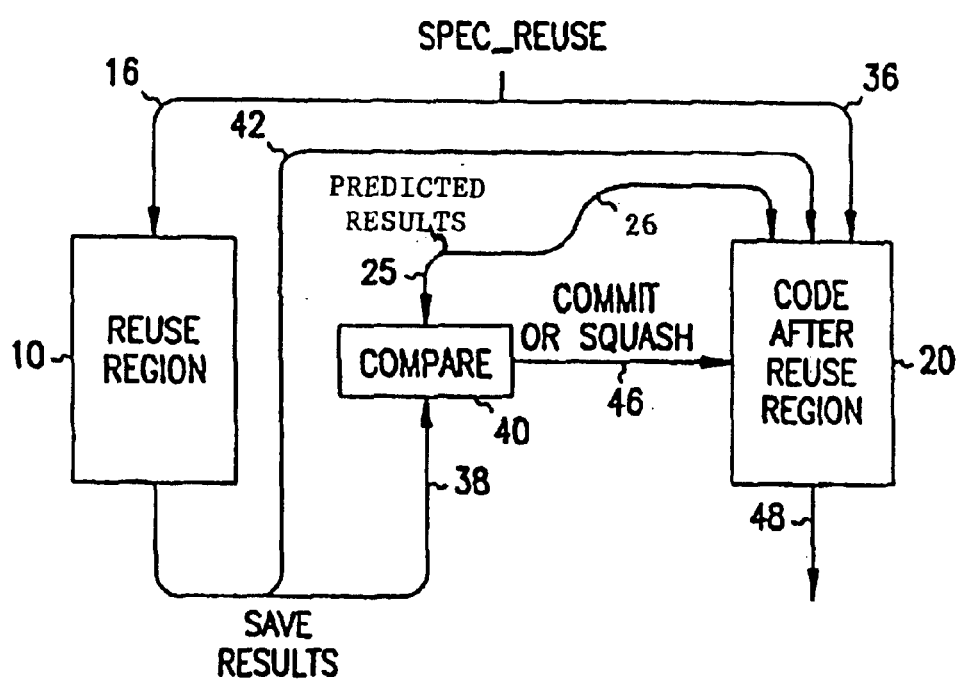

FIG. 1C shows a speculative execution scenario involving either an absence of a matching instance or an aliased reuse region. Reuse region 10 as shown in FIG. 1C can be identified by the spec reuse instruction inserted by the compiler at the beginning of reuse region 10. When the processor encounters the spec reuse instruction, speculative execution begins. Reuse region 10 and code region 20 are executed in parallel as shown by paths 16 and 36.

Code region 20 is executed using the predicted results as shown by path 26. The results are predicted based on reuse region instance information which pertains to multiple instances of reuse region 10. In contrast to the scenario illustrated in FIG. 1B, code region 20 in FIG. 1C is speculatively executed, whereas in FIG. 1B, it is not.

The predicted results used for the speculative execution of code region 20 may prove to be incorrect. Reuse region 10 is executed in parallel with code region 20 to verify that the predicted results are valid. If the predicted results are valid, then the speculative execution can become non-speculative, or be "committed," and if the predicted results are not valid, then the speculative execution is thrown away, or "squashed."

As reuse region 10 executes, new results are created as shown by path 38. The new results are provided to comparator 40, as are the predicted results as shown by path 25. Comparator 40 compares the predicted results and the new results. When comparator 40 determines that the predicted results match the new results, the speculative execution of code region 20 is committed and is no longer speculative. When this occurs, the prediction of the results has been successfully reused. From an execution time standpoint, the scenario just described appears much like that of FIG. 1B (except that in FIG. 1B, the previous results are used instead of the predicted results used in FIG. 1C). Code region 20 is executed using the predicted results when reuse region 10 is encountered, and a performance gain is achieved by bypassing the execution of reuse region 10.

When comparator 40 determines that the predicted results do not match the new results, the speculative execution of code region 20 is squashed. Code region 20 is then executed anew using the new results as just computed by reuse region 10, as shown by path 42. The new results can also be written to the buffer for subsequent use.

FIG. 1C is a logical diagram that includes mechanisms capable of implementation in hardware or software. In some embodiments, the entire implementation is in hardware. This provides a very fast and efficient implementation. In other embodiments, a mix of hardware and software is used. For example, comparator 40 can be implemented in a combination of dedicated hardware and software, such as state machines or microcoded blocks.

As previously mentioned, the compiler that compiled the reuse regions aids in the reuse of code by adding instructions to signal to the hardware that reuse is possible. Normal reuse and spec reuse instructions have previously been described. In some embodiments, the compiler also adds "end of region" instructions to signal the end of a reuse region, and annotates some register update instructions as "live-out" instructions. Live-out instructions are those instructions whose results outlive the execution of the region and become outputs of the region. Examples of live-out instructions include register update instructions that update "live-out" registers. Live-out registers are those registers that are utilized outside the scope of the reuse region.

Figure 2:
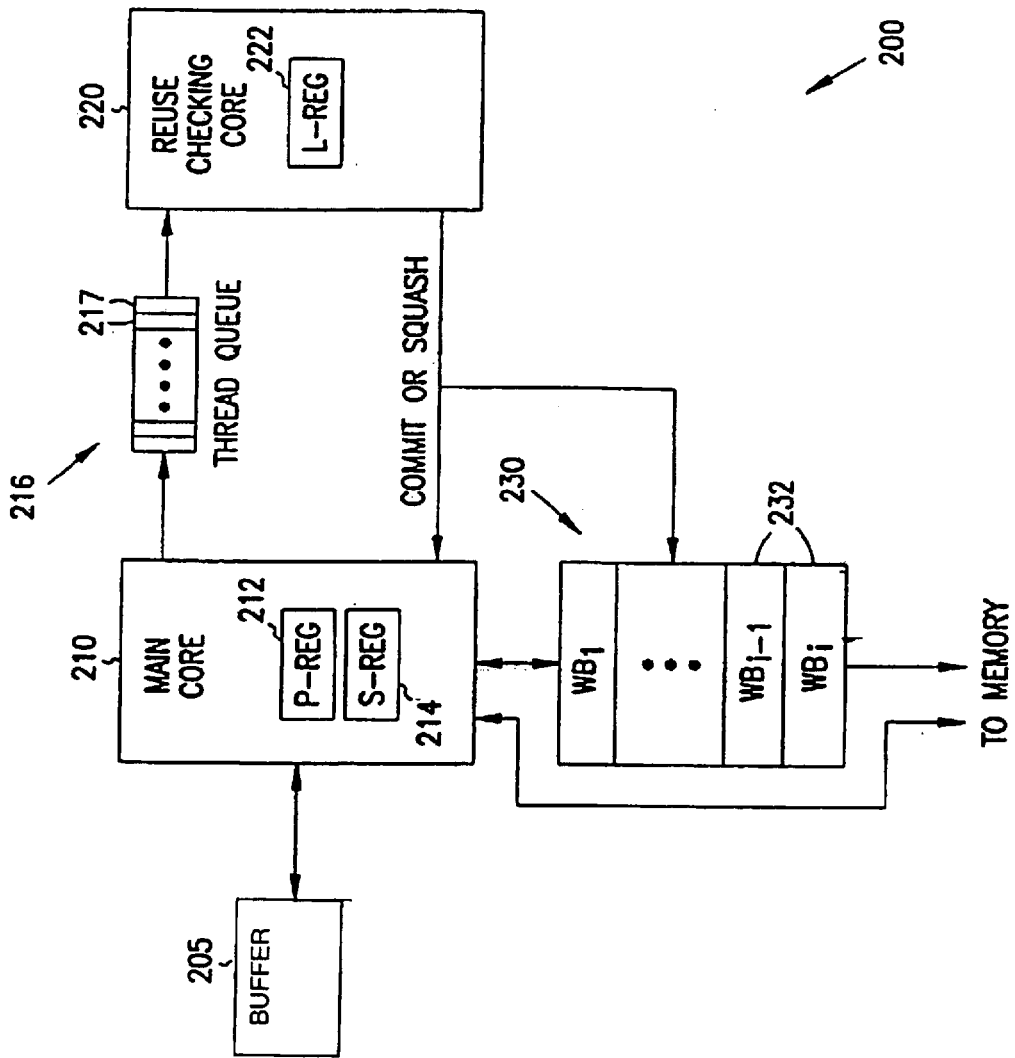
FIG. 2 is a block diagram of one embodiment of a speculative reuse microarchitecture.

As described above, in one embodiment, the present invention may be supported by a dual core processor that is able to execute code instructions concurrently. FIG. 2 illustrates one embodiment of a speculative reuse microarchitecture based on a dual core processor. Embodiment 200 includes a dual core processor having main processing core 210, reuse checking core 220, thread queue 216, write-back buffer block 230, and buffer 205. Embodiment 200 can be included within a processor such as a microprocessor, digital signal processor, microcontroller, or the like. Main core 210 includes a "persistent" register file shown as P-reg 212, which is used when main core 210 is in "non-speculative mode." Main core 210 also includes a "shadow" register file shown as S-reg 214, which is used when main core 210 is in "speculative mode." Speculative mode and non-speculative mode are discussed in more detail with respect to the threaded execution model below.

Buffer 205 may represent a combined buffer used to store instances of reuse regions and predict output values of reuse instances. Alternatively, buffer 205 may represent more than one buffer. For example, buffer 205 may represent a reuse buffer and a value prediction buffer. Buffer 205 is described in greater detail in conjunction with FIG. 4.

Write-back buffer block 230 includes a number of write-back buffers 232 each being identified by an index. Each of write-back buffers 232 includes a set of register values and memory updates capable of storing the results of instructions during speculative execution. When main core 210 is speculatively executing code, results are placed in one or more write-back buffers 232 until the execution is no longer speculative.

Reuse checking core 220 includes a "local" register file shown as L-reg 222 in FIG. 2. In some embodiments, P-reg 212, S-reg 214, and L-reg 222 all have the same structure. Main core 210 creates threads for execution in reuse checking core 220 and communicates them to reuse checking core 220 using thread queue 216. In some embodiments, each thread in thread queue 216 is specified by a "thread structure" shown as thread structures 217. Each thread structure 217 represents a reuse region for reuse checking core 220 to check, and includes a starting instruction pointer (IP) address for the reuse region, and the input values and predicted results being utilized for speculative execution. Thread structure 217 also includes the index of the current write-back buffer used to commit and squash speculatively executed instructions, and the IP address of the instruction after the reuse region.

Embodiment 200 uses a threaded execution model. Each program starts with main core 210 executing instructions in non-speculative mode. When in non-speculative mode, P-reg 212 is used to store register values, and memory updates are directly committed. Write-back buffer block 230 is not used when main core 210 is executing in non-speculative mode.

Main core 210 enters speculative mode when a spec reuse instruction is encountered in a program, and output values of the reuse region are predicted using reuse region instance information in buffer 205. Main core 210 creates a new thread for execution of the code in the reuse region and places a thread structure describing the new thread into thread queue 216. Information describing the new thread includes input values and predicted output values of the reuse region.

Main core 210 then copies the contents of P-reg 212 to S-reg 214 and speculatively executes the code occurring after the reuse region using the predicted results. During speculative execution, main core 210 accesses S-reg 214 and sends register updates and memory updates to the current write-back buffer 232.

Main core 210 may encounter other spec reuse instructions during speculative execution. Each spec reuse instruction causes a new thread to be created and a thread structure to be entered into the thread queue. The speculative execution between two consecutive reuse instructions that spawn new threads is termed a "speculation region." Each speculation region uses a separate write-back buffer 232, and each write-back buffer can be committed individually depending on the outcome of the thread spawned by the first reuse instruction in the speculation region.

When main core 210 creates a new thread while in speculative mode, it marks the end of the current write-back buffer, and continues speculative execution using the next write-back buffer. For example, if main core 210 is in speculative mode and is using write-back buffer $Wb_{i-1}$ when a spec reuse instruction is encountered, main core 210 marks the end of write-back buffer $WB_{i-1}$, and continues speculative execution using write-back buffer $WB_i$.

Reuse checking core 220 repeatedly fetches thread structures from thread queue 216 and executes the corresponding threads. When reuse checking core 220 fetches a thread structure from thread queue 216, the input values are copied into L-reg 222, and execution starts from the starting IP address specified in the thread structure. When the end-of-region instruction is encountered, reuse checking core 220 compares the predicted results provided in the thread structure with the actual results produced. If the values match, reuse checking core 220 sends a "commit" request to main core 210. The commit request takes the form of "commit i," where i is the index of the write-back buffer that was stored in the thread structure that defined the thread to be executed by reuse checking core 220.

When main core 210 receives a request to commit, it commits all the results in the write-back buffer indexed by i to memory and to P-reg 212. $WB_i$ is then made available for use, and main core 210 switches to non-speculative mode if $WB_i$ was the only write-back buffer in use. If more write-back buffers are in use, then main core 210 remains in speculative mode.

If reuse checking core 220 finds that the results of the thread are different from those in the thread structure, it sends a request to main core 210 to squash the speculative execution. The squash request takes the form of "squash ip," where ip is the IP for the instruction after the reuse region in the thread structure. When main core 210 receives a squash request, it first squashes all the write-back buffers. It then copies the output register values in the thread structure to P-reg 212 and resumes execution at the instruction pointed to by ip. Main core 210 then executes in non-speculative mode.

Embodiment 200 has been described with two processing cores: main core 210 and reuse checking core 220. Other embodiments include more than two cores. For example, some embodiments may include multiple reuse checking cores. In these embodiments, the main core can assign threads to more than one reuse checking core. This allows more reuse checking to be performed in parallel. It should be noted that a variety of microarchitectures other than those described above may be used to support the present invention without loss of generality.

Figure 3:
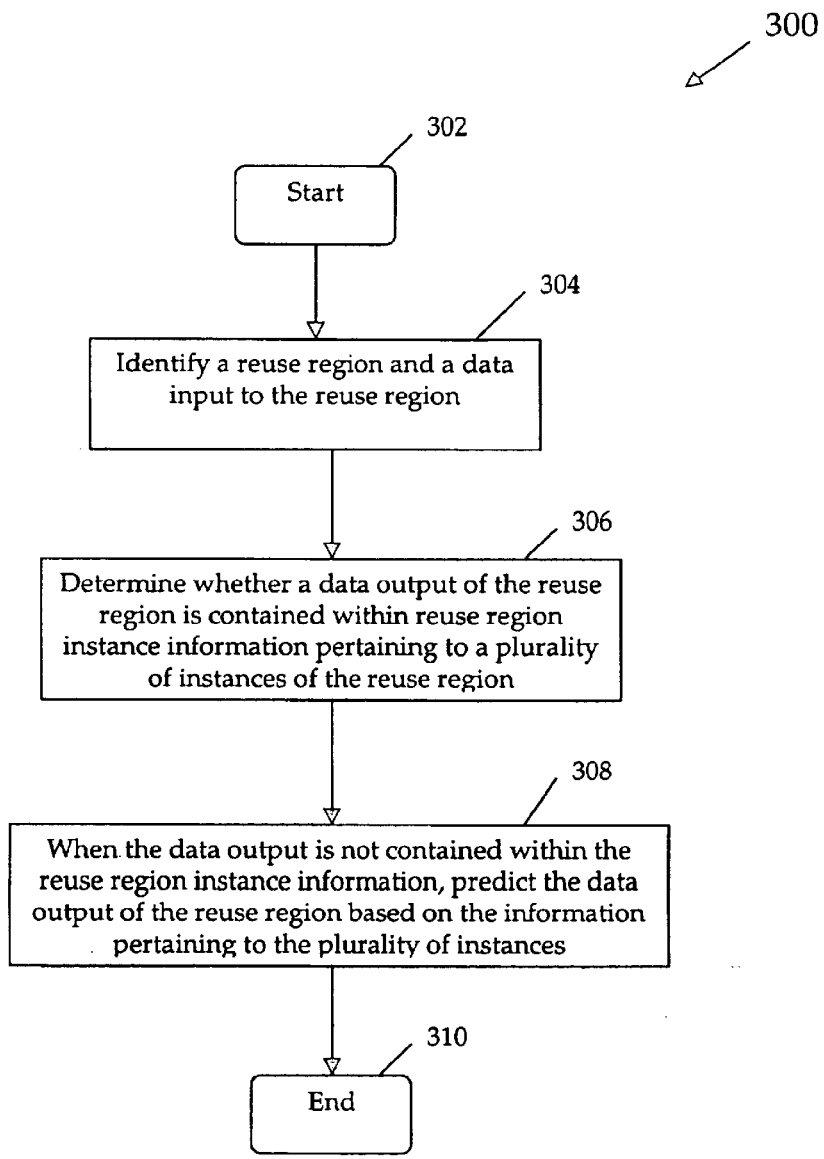
FIG. 3 is a flow diagram of one embodiment of a process for reusing regions of code.

FIG. 3 is a flow diagram of one embodiment of a process for reusing regions of code. The process is performed by processing logic, which may comprise hardware, software, or combination of both. The processing logic may be either in a processor, or partially or entirely in a separate device and/or system.

Referring to FIG. 3, the process begins with identifying a reuse region and a data input to the reuse region (processing block 304). In one embodiment, the reuse region may be identified during the execution of the program using an instruction (e.g., a spec_reuse instruction or a normal_reuse instruction) inserted by a compiler at the beginning of the reuse region.

At processing block 306, processing logic determines whether a data output of the reuse region is contained within reuse region instance information. The reuse region instance information pertains to a plurality of instances of the reuse region. In one embodiment, the reuse region instance information includes input information and output information for each instance of the reuse region. Input information may identify input registers and their values. Similarly, output information may identify output registers (i.e., live-out registers) and their values. In one embodiment, the reuse region instance information may further include confidence counters for each register of the reuse region. Confidence counters will be described in greater detail below.

In one embodiment, the determination that the reuse region instance information contains the data output is made if current data input to the reuse region matches any input information within the reuse region instance information and the reuse region is identified by a normal reuse instruction inserted by the compiler at the beginning of reuse region. The reuse region is identified by the normal reuse instruction when the instance with matching input information may not be potentially invalidated. As described above, the invalidation may occur if the reuse region includes an aliased memory load instruction. In one embodiment, if processing logic in the processor determines that data output of the reuse region is contained within the reuse region instance information, the reuse region is bypassed and output values from the matching instance are used to execute the code following the reuse region.

When the data output is not contained within the reuse region instance information, processing logic predicts the data output of the reuse region based on the reuse region instance information (processing block 408). In one embodiment, predicting the data output includes predicting a current set of live-out registers for storing output values of the reuse region and then predicting an output value for each of the above registers.

In one embodiment, a union prediction technique is used to predict the current set of live-out registers. That is, the live-out registers from all the instances of the reuse region are combined to predict the current set of the live-out registers. Alternatively, a last instance prediction technique is used to predict the current set of live-out registers. According to this technique, the live-out registers of the most recently used instance are used to predict the current set of live-out registers. It should be noted that a variety of other prediction techniques can be used for predicting live-out registers without loss of generality.

As described above, in one embodiment, prediction of the current set of live-out registers is followed by predicting an output value for each live-out register. Prediction of an output value is performed according to a particular prediction technique. In one embodiment, more than one prediction technique is utilized to predict the output value. In this embodiment, each register is associated with multiple confidence counters. Each confidence counter contains a value reflecting the accuracy of using a particular prediction technique for this register. Before predicting an output value of the register, the confidence counters are compared, and the prediction technique with the highest confidence counter is selected to predict the output value of this register.

In one embodiment, the prediction techniques used to predict output values include a last value prediction technique, a stride prediction technique, and a context-based prediction technique. In one embodiment, a prediction list is maintained to point to an appropriate list of instance(s). How the instances pointed to by the prediction list are used depends on the prediction technique selected. The prediction list will be described in more detail below in conjunction with FIG. 4.

The last value prediction technique assumes that a current output value ($x_1$) of the live-out register ($t_1$) is an output value ($u_{11}$) of this register in the most recently used instance ($RI_1$) (i.e., $x_1=u_{11}$). The stride prediction technique may predict that the current output value is the sum of the output value of this register in the most recently used instance and a stride, which is the difference between output values of the live-out register in the two most recently used instances. For example, if the output values in the two most recently used instances are $u_{11}$ and $u_{12}$, the predicted output value $x_1=u_{11}+(u_{11}-u_{12})$. It should be noted that other stride prediction techniques (e.g., a two-delta stride prediction technique) can also be used to predict the output values.

The context-based prediction technique considers that output values follow a repetitive sequence, and thus, estimates the current output value based on the sequence of history values. In one embodiment, the history values are output values of the live-out register in all the instances of the reuse region. In one embodiment, a value prediction table (VPT) is used to provide a predicted output value. In this embodiment, the history values are hashed to form an index to the VPT table. Using this index, a value from the VPT table is selected and used as a predicted output value. For example, the history values may be hashed together with the identity of the reuse region (e.g., an instruction pointer (IP) of the region entry and live-out register number) to obtain the output value $x_1$ from the VPT table. Namely, $x_1$=VPT (hash ($u_{11}, \ldots, u_{k1}$, IP, $t_1$), where $u_{11}, \ldots, u_{k1}$ are output values of register $t_1$ from all the instances within the reuse region identified by IP. A hashing function used in the above expression to create an index to the VPT table may be any hashing function known in the art.

It should be noted that a wide variety of prediction techniques other than those described above can be used to predict the output values of the reuse region without loss of generality.

Figure 4:
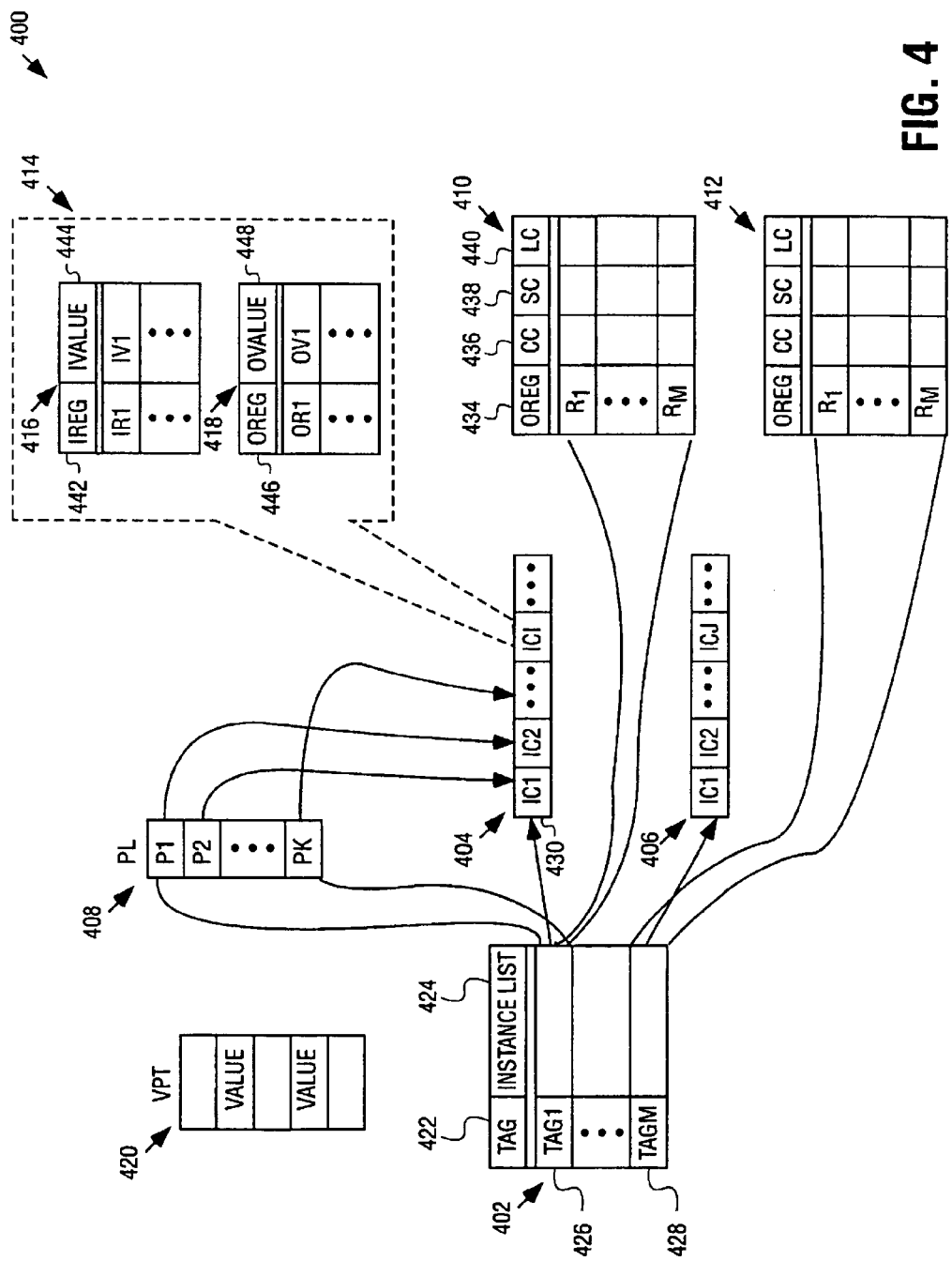
FIG. 4 is a block diagram of one embodiment of a reuse and value prediction buffer.

The reuse region instance information is stored in buffer 205 shown in FIG. 2. As described above, in one embodiment, buffer 205 may represent a combined reuse and value prediction buffer. Alternatively, buffer 205 may represent two separate buffers, i.e. a reuse buffer and a value prediction buffer. FIG. 4 is a block diagram of one embodiment of a reuse and value prediction (RVP) buffer. In one embodiment, the RVP buffer is buffer 205 of FIG. 2.

RVP buffer 400 includes a reuse region list 402. The reuse region list 402 includes multiple entries, each entry having a tag field 422, and an instance list 424. Tag field 422 uniquely identifies reuse regions that have instance lists included within RVP buffer 400. For example, entry 426 has a tag field value of "TAG1," and the corresponding instance list is shown in an exploded view as instance list 404. Instance list 404 includes a number of reuse instances for the reuse region corresponding to entry 426 in reuse region list 402. In some embodiments, other fields are included in instance lists, such as, for example, valid flags indicating whether information in reuse instances 430 is valid, fields carrying least recently used information (LRU) for replacement purposes, etc.

Each reuse instance 430 includes input information and output information as shown in an exploded view 414. The input information 416 of each instance includes a set of live-in registers 442 with corresponding input values 444.

Similarly, the output information 418 of each instance includes a set of live-out registers 446 with their corresponding output values 448.

Each live-out register has a number of confidence counters. Entry 426 in reuse region list 422 refers to a confidence counter list 410 for the reuse region. Confidence counter list 410 includes live-out registers 434 from all the instances within the region and three prediction confidence counters for each live-out register. The prediction confidence counters include a confidence counter 436 for a context-based prediction technique, a confidence counter 438 for a stride prediction technique, and a confidence counter 440 for a last value prediction technique. A confidence counter is incremented every time an output value predicted by a corresponding predictor (i.e., a prediction technique) is correct and is decreased every time the value is predicted incorrectly. Although confidence counters for only three predictors are described, RVP buffer 400 may include confidence counters for more or less predictors, and any predictors other than those described above can be used to predict output values of reuse regions without loss of generality.

Predictors 436–440 use a prediction list 408 to predict output values. Entry 426 in reuse region list 402 refers to prediction list 408 for a corresponding reuse region. Prediction list 408 includes pointers to reuse instances 430 within the reuse region. Every time an instance of the reuse region is created or reused, a pointer to this instance is added to the beginning of prediction list 408. When a reuse instance is replaced, its pointer is removed from prediction list 408. If replacement is made in accordance with an LRU policy, a pointer is removed from the end of prediction list 408 and a corresponding instance is removed from instance list 404.

When a predictor for an output value is selected using corresponding confidence counters from confidence counter list 410, prediction list 408 is used to point to certain instances whose output values need to be used for prediction. That is, for a last value predictor, prediction list 404 points to the most recently used instance. For a stride predictor, prediction list 404 may point to the two most recent instances. The context-based predictor uses output values of the live-out register from all the instances of the reuse region to create an index to VPT table 420. When the index is created, a corresponding value is retrieved from VPT table 420 and is then used as a predicted output value for the live-out register. If the predicted output value differs from an actual result received by executing the reuse region, the value in VPT table 420 is replaced with the actual result, thereby gradually improving the accuracy of predicted values in VPT table 420.

Figure 5A:
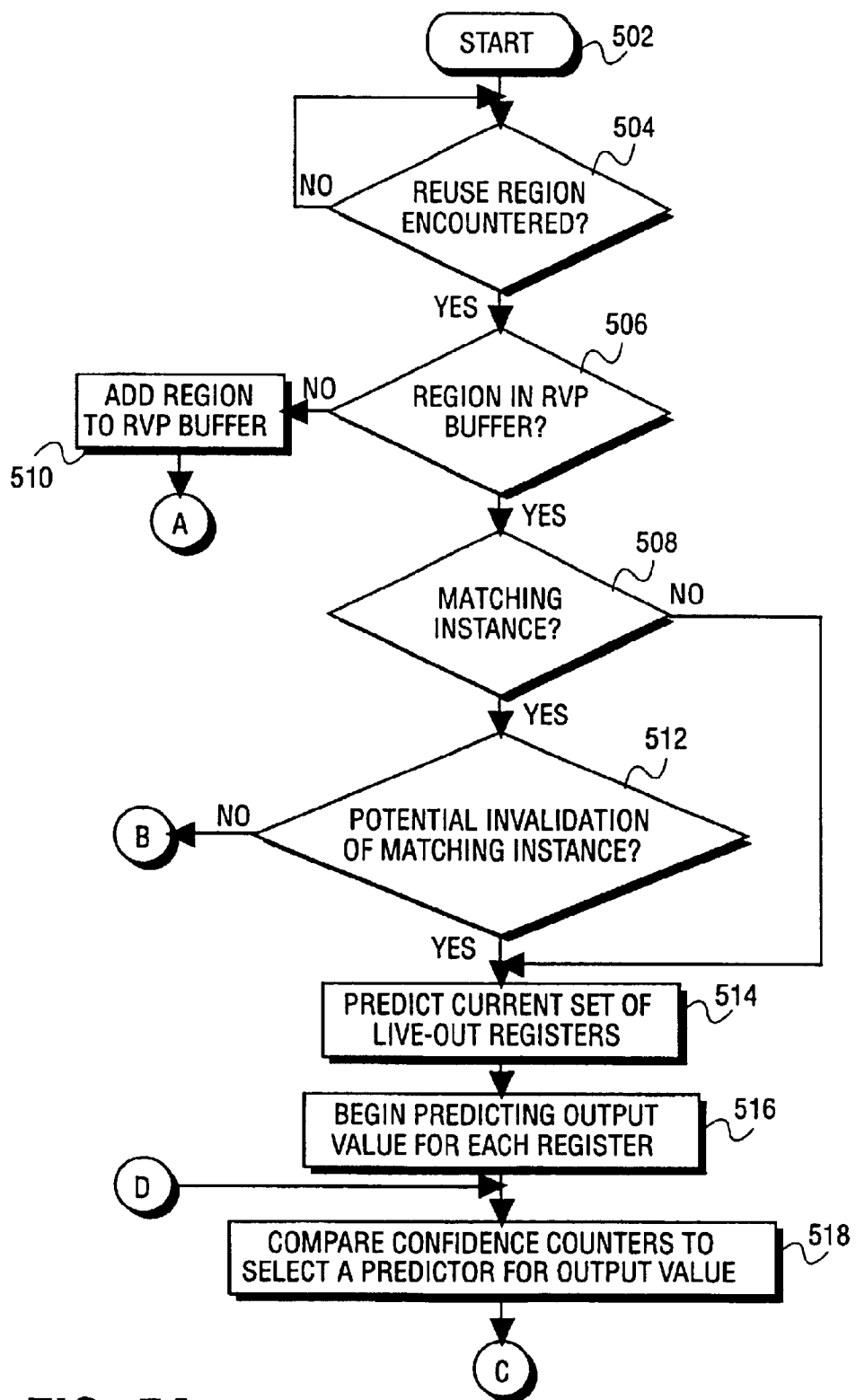
FIGS. 5A-5C are flow diagrams of one embodiment of a process for predicting output values for a reuse region.
Figure 5B:
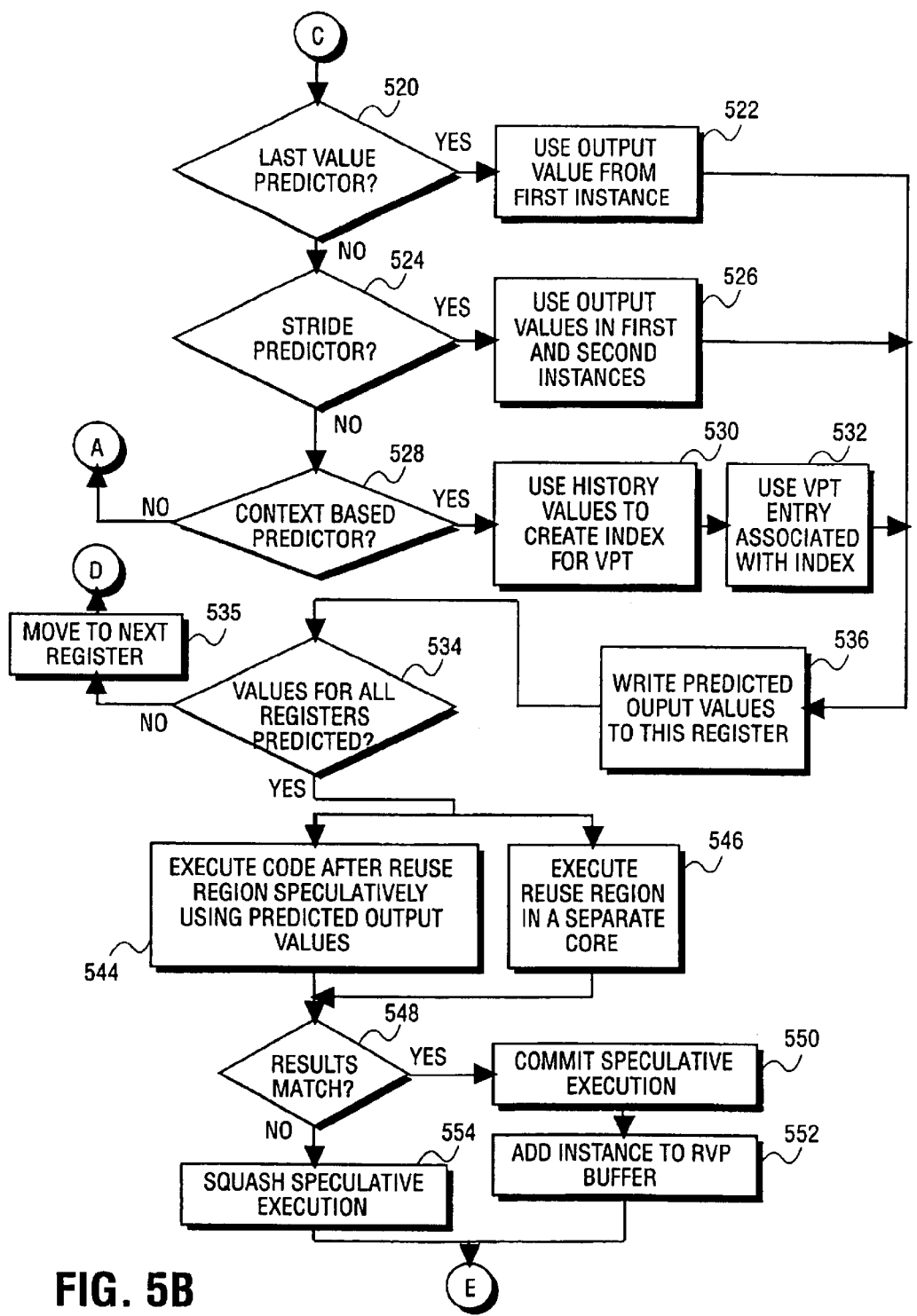
Figure 5C:
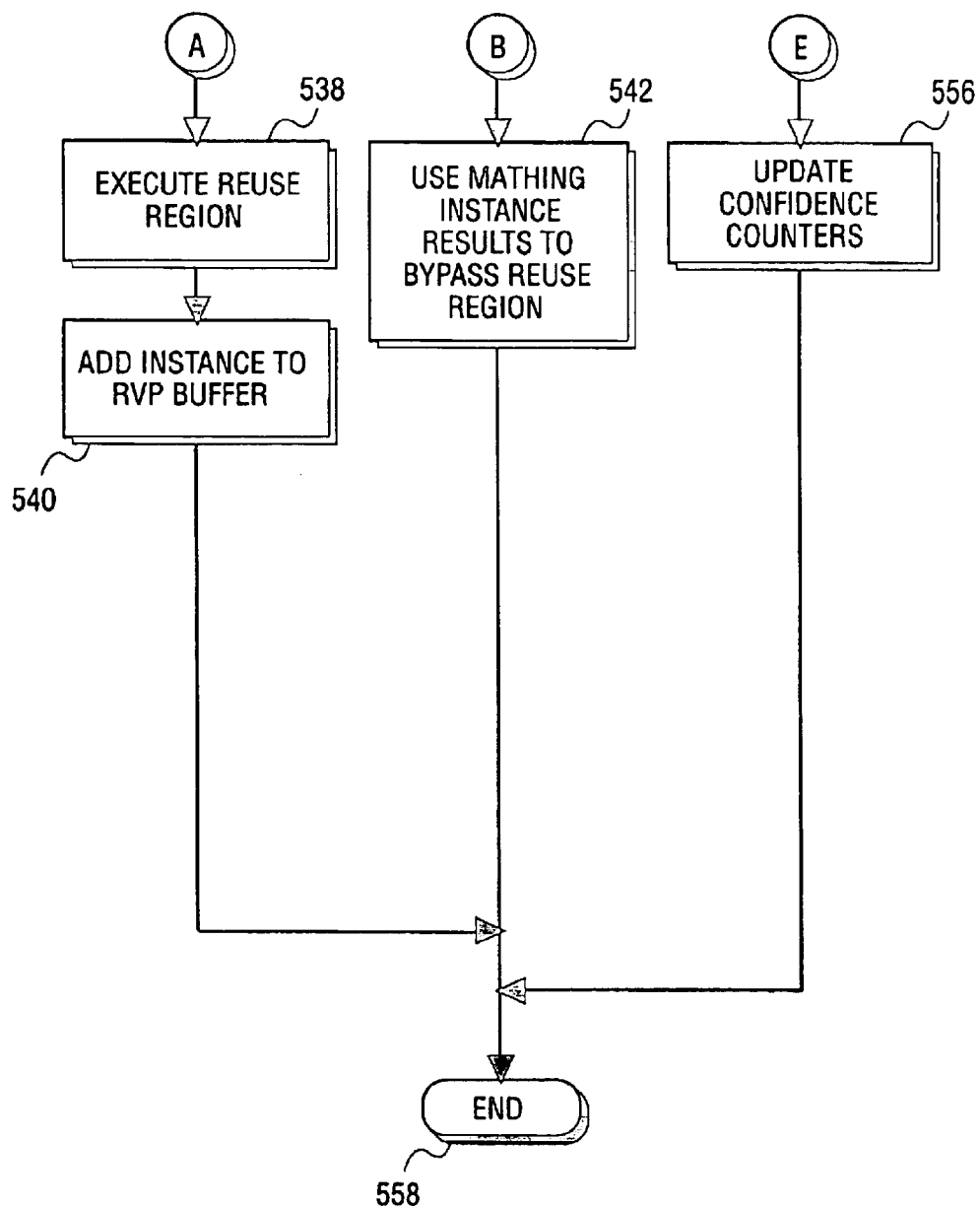

FIGS. 5A-5C are flow diagrams of one embodiment of a process for predicting output values of a reuse region. The process is performed by processing logic, which may comprise hardware, software, or combination of both. The processing logic may be either in a processor, or partially or entirely in a separate device and/or system.

Referring to FIGS. 5A-5C, the process begins with waiting in decision block 504 until a reuse region is encountered. When a reuse region is encountered, decision block 506 determines if the reuse region is represented by an entry in an RVP buffer. If not, an entry is made in the RVP buffer for the reuse region in processing block 510, the reuse region is executed in processing block 538, and an instance is added to the RVP buffer in processing block 540.

If the region is represented by an entry in the RVP buffer, decision block 508 determines whether a matching instance exists. A matching instance is an instance having input values identical to the input values for the current execution. If the matching instance is not found, the process skips decision block 512 and flows directly to processing block 514. If the matching instance is found, decision block 512 determines whether invalidation of the matching instance can potentially occur. As described above, invalidation may happen if the reuse region includes a memory instruction that accesses an aliased memory address. If invalidation of the matching instance may not occur, the results of the matching instance are used to bypass the reuse region in processing block 542. If the matching instance may be invalidated, the process flows to processing block 514.

At processing block 514, a set of live-out registers for current execution is predicted. Next, processing block 516 begins predicting output values for each register in the set of live-out registers. Starting with the first live-out register, confidence counters associated with this live-out register are compared to select a predictor for predicting an output value for this register (processing block 518). If the selected predictor is a last value predictor (decision block 520), an output value from the most recently used instance is used as a predicted output value for this live-out register (processing block 522). If the selected predictor is not a last value predictor, decision block 524 determines whether the selected predictor is a stride predictor. If it is the stride predictor, output values from the two most recent instances are used to predict the output value in current execution in processing block 526.

If the selected predictor is not a stride predictor, decision block 528 determines whether the selected predictor is a context-based predictor. If it is a context-based predictor, history values associated with the live-out register are used to create an index for a VPT table (processing block 530) and to use the value in a VPT entry associated with the index as a predicted output value (processing block 532).

If the selected predictor is not a context-based predictor, the reuse region is executed in processing block 538, and an instance is added to the RVP buffer in processing block 540. Alternatively, when any of processing blocks 522, 526 and 532 is executed, a predicted output value is subsequently written to the live-out register in processing block 536, and then the process flows to decision block 534. Decision block 534 determines whether output values are predicted for all live-out registers in the current execution. If not all the output values are predicted, processing logic moves to the next register in the set of current live-out registers (processing block 535), and a loop for predicting an output value for the next register is performed as described above. The loop is performed as many times as needed to predict all output values of the reuse region in the current execution.

When all the output values are predicted, the code following the reuse region is executed speculatively using the predicted output values in processing block 544. At processing block 546, the reuse region is executed to verify that the predicted output values are correct. In one embodiment, processing block 546 is performed in parallel with processing block 544. Alternatively, processing block 546 is executed after processing block 544.

At decision block 548, a determination is made as to whether the predicted output values match the actual results. If they do not, the speculative execution performed in processing block 544 is squashed (processing block 554), and values of corresponding confidence counters in the RVP buffer are updated to reflect that the results of prediction (processing block 556). Specifically, each confidence counter corresponding to an output value which was predicted incorrectly is decreased, and if any output value was predicted correctly, a corresponding confidence counter is incremented.

Otherwise, if the predicted output values match the actual results, the speculative execution is committed (processing block 550), the instance is added to the RVP buffer (processing block 552), and corresponding confidence counters are incremented to reflect the correct prediction (processing block 556).

Figure 6:
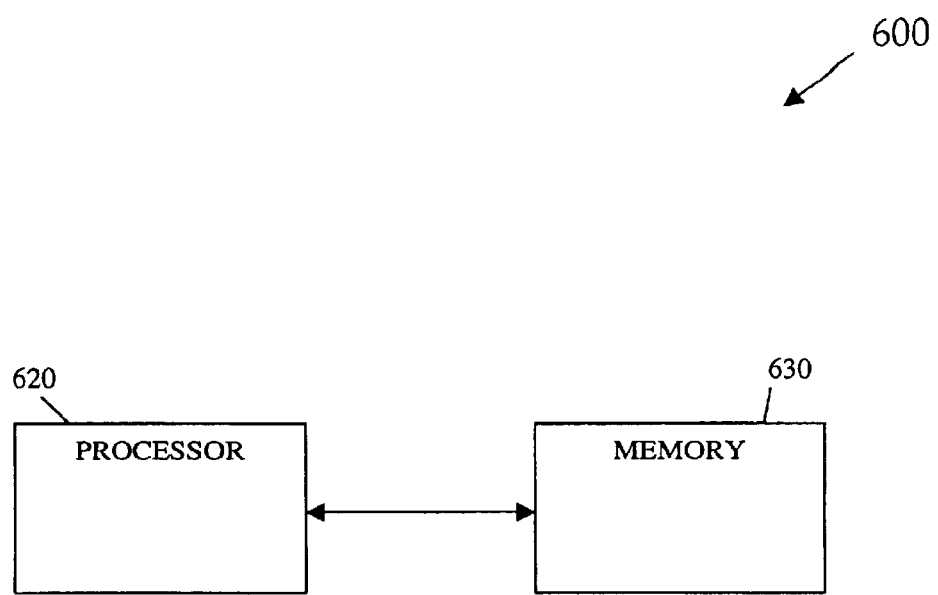
FIG. 6 is a block diagram of one embodiment of a processing system.

FIG. 6 is a block diagram of one embodiment of a processing system. Processing system 600 includes processor 620 and memory 630. In some embodiments, processor 620 is a processor capable of compiling software and annotating reuse regions. Processor 620 can also be a processor capable of speculative execution of code, such as the dual core processor of FIG. 2. Processor 620 can be any type of processor capable of executing software, such as a microprocessor, digital signal processor, microcontroller, or the like. Processing system 600 can be a personal computer (PC), mainframe, handheld device, portable computer, set-top box, or any other system that includes software.

Memory 630 can be a hard disk, a floppy disk, random access memory (RAM), read only memory (ROM), flash memory, or any other type of machine medium readable by processor 620. Memory 630 can store instructions for performing the execution of the various method embodiments of the present invention such as methods 300 and 500 (FIGS. 3, 5A-5C).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for speculatively reusing regions of code, the method comprising:
    identifying a reuse region and input data of the reuse region;
    searching a plurality of instances of the reuse region for a valid matching instance that has matching input data and cannot be potentially invalidated; and
    if the valid matching instance is not found, predicting, for the reuse region, a current set of live-out values using reuse region instance information pertaining to the plurality of instances of the reuse region.

2. The method of claim 1 wherein searching the plurality of instances comprises:
    determining whether the input data of the reuse region matches any input information within the reuse region instance information; and
    if the input data matches input information within the reuse region instance information, determining whether the reuse region is identified by a normal reuse instruction.

3. The method of claim 1 wherein the reuse region instance information includes input information and output information for each instance of the reuse region.

4. The method of claim 3 wherein the reuse region instance information further includes a plurality of confidence counters for each live-out register of the reuse region, each of the plurality of confidence counters being associated with a prediction technique.

5. The method of claim 4 wherein predicting the current set of live-out values comprises:
    comparing a plurality of confidence counts associated with each live-out value in the set;
    selecting an optimal prediction technique for said each live-out value in the set based on comparison; and
    selecting an output value for said each live-out value in the set using the optimal prediction technique.

6. The method of claim 5 wherein the optimal prediction technique is any one of a context-based prediction technique, a stride prediction technique, and a last value prediction technique.

7. An apparatus comprising:
    a buffer to hold reuse region instance information pertaining to a plurality of instances of a reuse region; and
    a processing core to search the buffer for a valid matching instance that has input data matching current input data of the reuse region and cannot be potentially invalidated, to predict for the reuse region a current set of live-out registers and an output value for each live-out register in the set based on the reuse region instance information if the valid matching instance is not found in the buffer, and to speculatively execute instructions using predicted output values of the reuse region.

8. The apparatus of claim 7 wherein the processing core is to search the buffer for a valid matching instance by finding an instance with input data matching the current input data of the reuse region and determining whether the reuse region is identified by a normal reuse instruction.

9. The apparatus of claim 7 wherein the reuse region instance information includes input information and output information for each instance of the reuse region.

10. The apparatus of claim 9 wherein the reuse region instance information further includes a plurality of confidence counters for each live-out register of the reuse region, each of the plurality of confidence counters being associated with a prediction technique.

11. The apparatus of claim 7 wherein the buffer includes a prediction list having a plurality of pointers to reuse region instances held in the buffer, a pointer to the most currently used instance being located at the top of the prediction list and a pointer to the least currently used instance being located at the bottom of the prediction list.

12. The apparatus of claim 11 wherein the processing core is to predict an output value for each live-out register by comparing a plurality of confidence counters associated with said each live-out register, selecting an optimal prediction technique for said each live-out register based on comparison, and selecting the output value for said each live-out register using the optimal prediction technique.

13. The apparatus of claim 11 wherein:
the prediction list points to a most recently used instance if the optimal prediction technique is a last value prediction technique;
the prediction list points to two most recently used instances if the optimal prediction technique is a stride prediction technique; and
the prediction list points to instances associated with a corresponding live-out register if the optimal prediction technique is a context-based prediction technique, the associated instances being used to calculate an index pointing to a predicted output value in a value prediction table maintained in the buffer.

14. The apparatus of claim 7 wherein the buffer includes a value prediction table having an entry that includes a predicted output value, the predicted output value being located using an index.

15. A system comprising:
a memory to store regions of code; and
a processor, coupled to the memory, to identify a reuse region in the regions of code, to search a plurality of instances of the reuse region for a valid matching instance that has matching input data and cannot be potentially invalidated, and to predict for the reuse region a current set of live-out values using reuse region instance information pertaining to the plurality of instances of the reuse region if the valid matching instance is not found.

16. The system of claim 15 wherein the reuse region instance information includes input information and output information for each instance of the reuse region.

17. The system of claim 15 wherein the reuse region instance information includes a plurality of confidence counters associated with each live-out value in the set, each of the plurality of confidence counters being associated with a prediction technique.

18. A machine accessible medium comprising instructions, which when executed on a processing system, perform a method for speculatively reusing regions of code, the method comprising:
identifying a reuse region and input data of the reuse region;
searching a plurality of instances of the reuse region for a valid matching instance that has matching input data and cannot be potentially invalidated; and
if the valid matching instance is not found, predicting, for the reuse region, a current set of live-out values using reuse region instance information pertaining to the plurality of instances of the reuse region.

19. The machine accessible medium of claim 18 wherein searching the plurality of instances of the reuse region comprises:
determining whether the input data of the reuse region matches any input information within the reuse region instance information; and
if the input data matches input information within the reuse region instance information, determining whether the reuse region is identified by a normal reuse instruction.

20. The machine accessible medium of claim 18 wherein the reuse region instance information includes input information and output information for each instance of the reuse region.

21. The machine accessible medium of claim 20 wherein the reuse region instance information further includes a plurality of confidence counters associated with each live-out value in the set, each of the plurality of confidence counters being associated with a prediction technique.

22. The machine accessible medium of claim 21 wherein predicting the current set of output values comprises:
comparing the plurality of confidence counters;
selecting an optimal prediction technique for said each live-out value in the set based on comparison; and
selecting an output value for said each live-out value in the set using the optimal prediction technique.

23. The machine accessible medium of claim 22 wherein the optimal prediction technique is any one of a context-based prediction technique, a stride prediction technique, and a last value prediction technique.

* * * * *

UNITED STATES PATENT AND TRADEMARK OFFICE
CERTIFICATE OF CORRECTION

PATENT NO. : 6,836,841 B1
DATED : December 28, 2004
INVENTOR(S) : Wu et al.

It is certified that error appears in the above-identified patent and that said Letters Patent is hereby corrected as shown below:

Column 10,
Line 28, delete "$u_{kl}$" and insert -- $u_{ki}$ --.

Signed and Sealed this

Seventeenth Day of May, 2005

JON W. DUDAS
*Director of the United States Patent and Trademark Office*